United States Patent
Walker

(10) Patent No.: US 8,233,540 B2
(45) Date of Patent: Jul. 31, 2012

(54) METHOD OF TIME BASE RECONSTRUCTION FOR DISCRETE TIME LABELED VIDEO

(75) Inventor: Gordon Kent Walker, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 1431 days.

(21) Appl. No.: 11/373,605

(22) Filed: Mar. 9, 2006

(65) Prior Publication Data

US 2006/0209966 A1 Sep. 21, 2006

Related U.S. Application Data

(60) Provisional application No. 60/660,584, filed on Mar. 10, 2005.

(51) Int. Cl.
  *H04N 7/12* (2006.01)
(52) U.S. Cl. .................................. 375/240.16
(58) Field of Classification Search .......... 375/240.26
  See application file for complete search history.

(56) References Cited

U.S. PATENT DOCUMENTS

| | | | |
|---|---|---|---|
| 5,966,120 A * | 10/1999 | Arazi et al. ............... 715/724 |
| 6,191,821 B1 | 2/2001 | Kupnicki | |
| 6,486,922 B1 * | 11/2002 | Ueno ............... 348/589 |
| 6,629,256 B1 * | 9/2003 | Ilan et al. ............... 713/501 |
| 7,899,302 B2 * | 3/2011 | Salomons et al. .......... 386/241 |
| 2002/0131398 A1 | 9/2002 | Taylor | |
| 2003/0043847 A1 * | 3/2003 | Haddad ................. 370/473 |
| 2003/0190139 A1 | 10/2003 | Ishiguro et al. | |
| 2004/0073930 A1 | 4/2004 | Demas et al. | |

FOREIGN PATENT DOCUMENTS

| | | |
|---|---|---|
| EP | 0 881 840 A2 | 12/1998 |
| EP | 1 076 461 A1 | 2/2001 |
| EP | 1 289 306 A2 | 3/2003 |
| GB | 2328099 A | 2/1999 |
| JP | 2006510306 T | 3/2006 |
| WO | WO 2004/056126 A1 | 7/2004 |

OTHER PUBLICATIONS

International Search Report and Written Opinion—PCT/US2006/008487, International Search Authority—European Patent Office—Jul. 13, 2006.

* cited by examiner

*Primary Examiner* — Jay Patel
*Assistant Examiner* — Richard Torrente
(74) *Attorney, Agent, or Firm* — Dang M. Vo; John G. Rickenbrode

(57) ABSTRACT

A method and an apparatus for converting multimedia data of a digital format to multimedia data of an analog format, such as NTSC or PAL is disclosed, multimedia synchronous digital multimedia interfaces may be supported in a similar manner. The digital format includes image data and timing data where the timing data includes presentation times stamp information for the image data and is compatible with a communication system in which the transmitter and receiver operate based on a global clock, such as a GPS clock.

37 Claims, 5 Drawing Sheets

METHOD OF TIME BASE RECONSTRUCTION FOR DISCRETE TIME LABELED VIDEO

CROSS REFERENCE TO RELATED APPLICATIONS

This application claims priority to U.S. Provisional Application No. 60/660,584 entitled "A METHOD OF TIME BASE RECONSTRUCTION FOR DISCRETE TIME LABELED VIDEO" and filed on Mar. 10, 2005, which is hereby incorporated by reference, in its entirety.

BACKGROUND

1. Field

The field of the invention relates to multimedia data, and more particularly to processing the multimedia data.

2. Background

Due to the explosive growth and great success of the Internet and wireless communication, as well as increasing demand for multimedia services, streaming media over the Internet and mobile/wireless channels has drawn tremendous attention. In heterogeneous Internet Protocol (IP) networks, video is provided by a server and can be streamed by one or more clients. Wired connections include dial-up, integrated services digital network (ISDN), cable, digital subscriber line protocols (collectively referred to as xDSL), fiber, local area networks (LAN), wide area networks (WAN) and others. The transmission mode can be either uni-cast or multi-cast.

Digital multimedia data can be transmitted such that users with properly configured remote devices can process the multimedia data. For example, the multimedia data can comprise video data to a remote device configured to view the transmitted video data images. In some systems, the source of the video data is analog, such as a broadcast television signal, or an analog cable signal. Before transmission, such analog signals are converted to digital frame information. The digital frame information includes the image data for each frame. To convert the analog video signal, to digital data for presentation to an end user, an encoder needs to generate timing information for the generated digital video frames. The digital frame information and the timing information are transmitted together so that a receiving device is provided with the video frames and the presentation timing needed to properly display the video images. The format of the timing information varies according to system protocols, and according to some system protocols, digital frame information is transmitted with presentation time stamps (PTS), which indicate times at which each digital frame is to be presented.

The digital frame information and the PTS information can be transmitted as a digital video signal such that it may be received by users with the proper receiving equipment, called a receiver. Receivers typically also function as decoders, decoding the received digital video signal to extract the digital frame information and the PTS information. The decoded information is presented to the user in a time sequence according to the PTS information. It is understood by those of skill in the art, that in some systems, such as some wireless networks, the reference clock is global to both the transmitter and the receiver. In some systems, as the PTS information was generated at the transmitter in accordance with a reference clock, the receiver correctly determines the time for each frame to be presented by using the same reference clock. Some systems may use a globally transmitted clock, such as a GPS clock or GPS derived clock, or other common master. Accordingly, the receiver extracts the digital frame information and presents the frame images on a display according to the timing information constructed from the PTS information based on the global reference clock.

Often the displays on receivers are awkwardly small and may have poor viewing quality. In some situations there is a desire or need for displaying the video information on an analog monitor, such as a television, which may be larger and have better display quality. Because the frame data and the timing data are in a format for the telecommunication system, and not for the analog monitor, the frame data and the timing data must be converted to a format compatible with the analog monitor, such as NTSC or PAL.

SUMMARY

Each of the system, methods, and devices disclosed herein has several aspects, no single one of which is solely responsible for its desirable attributes. Without limiting the scope of this invention, its more prominent features will now be discussed briefly. After considering this discussion, and particularly after reading the section entitled "Detailed Description" one will better understand the features of this invention.

A method of processing video data transmitted via a system including a transmitter and a receiver each using a reference clock global to the transmitter and the receiver is disclosed. The method includes receiving video data, the video data including discrete time labels based on the global reference clock, generating a second clock based at least in part on the discrete time labels, and processing the video data so as to generate an analog video signal or digital video signal, where the video data is processed according to the second clock. The second clock is synchronous with the source video, rather than the common master clock.

A video data processing apparatus configured to process video data transmitted via a system including a transmitter and a receiver each using a reference clock global to the transmitter and the receiver is also disclosed. The apparatus includes a receiver configured to receive video data, the video data including discrete time labels based on the uniform system clock, a clock generator configured to generate a second clock based at least in part on the discrete time labels, and a processor configured to process the video data so as to generate an analog video signal, where the video data is processed according to the second clock.

A video data processing apparatus configured to process video data transmitted via a system including a transmitter and a receiver each using a reference clock global to the transmitter and the receiver is also disclosed. The method includes means for receiving video data, the video data including discrete time labels based on the global reference clock, means for generating a second clock based at least in part on the discrete time labels, and means for processing the video data so as to generate an analog (or digital video signals with display characteristics different from the received video data) video signal, where the video data is processed according to the second clock.

A computer readable medium including instructions, which, when executed on a device, cause the device to perform a method of processing video data transmitted via a system including a transmitter and a receiver, each using a reference clock global to the transmitter and the receiver is also disclosed. The method includes receiving video data, the video data including discrete time labels based on the global reference clock, generating a second clock based at least in part on the discrete time labels, and processing the video data so as to generate an analog video signal, where the video data is processed according to the second clock.

A processor configured to receive video data, the video data including discrete time labels based on a reference clock of a system including a transmitter and a receiver, the reference clock being global to the transmitter and the receiver, to generate a second clock based at least in part on the discrete time labels, and to process the video data so as to generate an analog video signal, where the video data is processed according to the second clock is also disclosed.

DETAILED DESCRIPTION

In the following description, specific details are given to provide a thorough understanding of the embodiments. However, it will be understood by one of ordinary skill in the art that the embodiments may be practiced without these specific details. For example, electrical components may be shown in block diagrams in order not to obscure the embodiments in unnecessary detail. In other instances, such components, other structures and techniques may be shown in detail to further explain the embodiments. It is also understood by skilled artisans that electrical components, which are shown as separate blocks, can be rearranged and/or combined into one component It is also noted that some embodiments may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

More particularly, it is contemplated that the methods and apparatus described herein may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, calculators, television monitors, flat panel displays, computer monitors, electronic photographs, electronic billboards or signs, projectors, architectural structures, and aesthetic structures. Devices similar to those discussed herein can also be configured as non-display devices themselves, but rather to output display signals for separate display devices.

Figure 1:
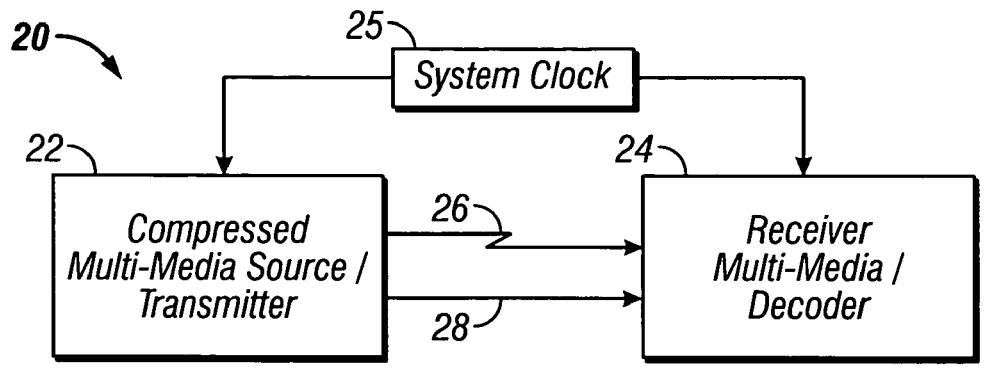
FIG. 1 is a block diagram illustrating a telecommunications system.

FIG. 1 illustrates a telecommunications system 20 comprising a transmitter 22 and a decoder 24. Transmitter 22 and decoder 24 may communicate via a wireless communication network 26 and a wired communication network 28, such as telephone, cable, or fiber optic. In the case of wireless communication systems, network 26 can comprise, for example, part of a code division multiple access (CDMA or CDMA2000) communication system or alternately, the system can be a frequency division multiple access (FDMA) system, orthogonal frequency division multiple access (OFDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques. Transmitter 22 encodes a generator compressed multimedia data of various forms including, but not limited to, video, audio, graphics, text, and pictures for transmission. The data can be compressed video and audio as in the MPEG-x and H.26x standards, compressed audio as in the MPEG-4 AAC, MP3, AMR and G.723 audio or voice compression standards, or any other type of digital data. Transmitter 22 is configured to transmit video data in accordance with a transmit reference clock, and generates timing information for the presentation of the frames with discrete time labels, such as presentation time stamps (PTS), which indicate times at which each digital frame is to be presented. Numerous other techniques of discrete time labeling are known by those of skill in the art, and may also be used.

The digital frame information and the PTS information are transmitted as a digital video signal so as to be received by decoder 24. Decoder 24 is configured to receive and decode the digital video signal so as to extract the digital frame information and the PTS information. Decoder 24 is further configured to present the digital frames at times corresponding to the PTS information based on a local clock. The decoder 24 utilizes a uniform system clock, i.e., the same reference clock as the transmit reference clock, so as to be synchronous. The local clock and the transmit reference clock are both generated based on a global system clock 25, such as a GPS clock. Other uniform system clocks, other than a GPS clock, can be readily implemented by persons skilled in that art. Consequently, decoder 24 extracts the digital frame information and presents the frame images on a display according to the timing information constructed from the PTS information based on the global reference clock.

Decoder 24 may also include multiple processors including a preprocessor, such as a processor manufactured by Arvinmeritor, Inc. (ARM), a digital signal processor (DSP) and a hardware video core, for distributing the demodulation and decoding tasks associated with received data. Decoder 24 also contains memory components for storing the received data and intermediate data in various stages of the demodulation/decoding process. The ARM preprocessor typically performs less complex tasks including unpacking (removing side information such as headers and signaling messages) and demultiplexing a plurality of bitstreams including audio, video and others. The ARM preprocessor also performs bitstream parsing, error detection and concealment and variable length entropy decoding. The DSP performs expansion of VLC (variable length code) codewords, inverse zig-zag scan of video data to spatially locate pixel coefficients, inverse AC/DC prediction of pixel coefficients for MPEG-4 video (not a feature of H.264 due to context adaptive entropy coding), and audio decoding (e.g. MPEG-4 AAC, MP3, AMR or G.723). The hardware video core performs the more computationally complex tasks of video decoding comprising dequantization, inverse transformation, motion compensated prediction, and deblocking (a form of filtering to reduce edge artifacts between pixel block edges).

Figure 2:
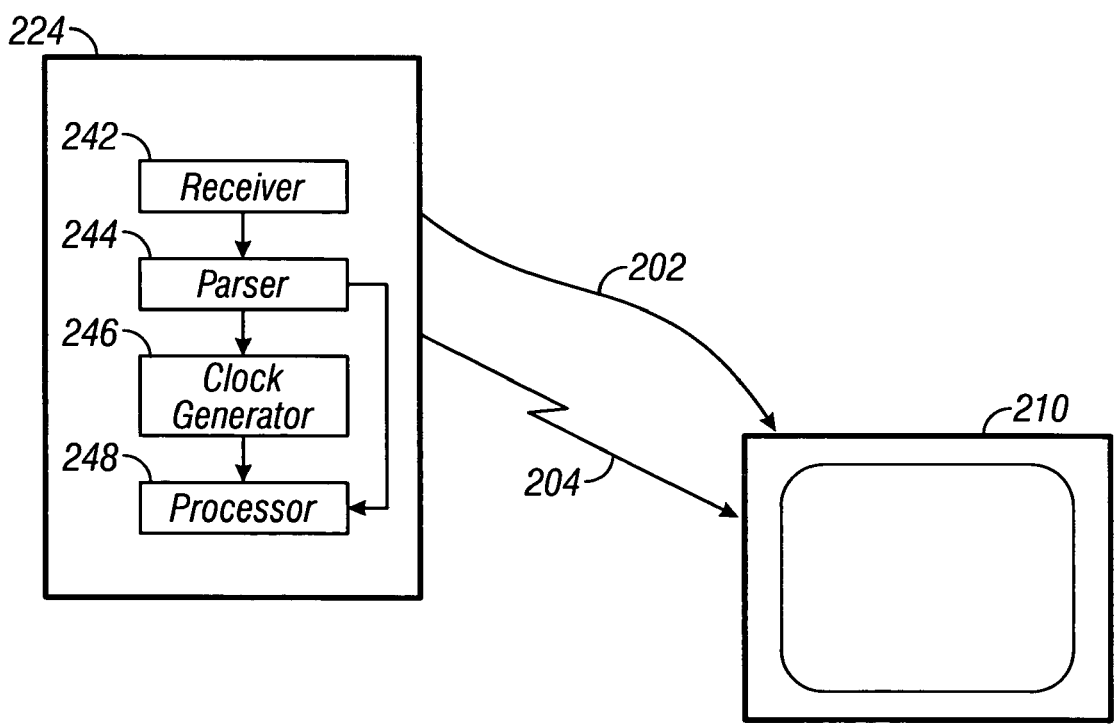
FIG. 2 is a block diagram illustrating a receiver configured for generating an analog signal for a television.

FIG. 2 illustrates a decoder 224 configured to perform receive and decode functions similar to those described above with reference to decoder 24 of FIG. 1, and is further configured to generate and output an analog video signal. As shown in FIG. 2, decoder 224 communicates with an analog monitor 210 via at least one of a wireless communication channel 204 and a wired communication channel 202.

Decoder 224 comprises a receiver 242, an optional parser 244, clock generator 246 and processor 248. Receiver 242 receives a digital video signal. In some embodiments receiver 242 comprises a RF circuit configured to receive digital data over a wireless network and to down-convert the digital video signal to a lower frequency. In some embodiments, receiver 242 comprises digital circuitry configured to receive and process the digital video signal according to the protocol of a wired network.

Parser 244 is configured to receive the digital video information from receiver 242. As received from receiver 242, the video data contains both PTS information and digital frame information. Despite being logically linked, the PTS information and the digital frame information contain information of different types, and are accordingly individually processed at different modules in decoder 224. To separate the PTS information and the digital frame information, parser 244 is further configured to parse the PTS information and the digital frame information from the digital video information. In some embodiments, the PTS information is passed to a clock generator 246, and the digital frame information is passed to a processor 248. In some embodiments the logical links between the PTS information and the digital frame information could be preserved. In such embodiments, this may be partially accomplished by also passing the PTS information to processor 248. Other synchronization methods may also be used.

Clock generator 246 is configured to generate a display reference clock, which is used by processor 248. In some embodiments, the display reference clock is based on the PTS information. More detailed description of certain aspects of clock generator embodiments is presented below.

Processor 248 is configured to receive digital frame information and the display reference clock. In some embodiments, processor 248 is also configured to receive the PTS information. Based on the received information and the display reference clock, processor 248 generates an analog video signal for display via analog monitor 210. Processor 248 may also generate a digital video signal to drive a digital display with characteristics different from the received digital frame information. For example, received video data may correspond to a different color space format such as that of CCIR 602 from the digital display which can be, for example, LCD with 6 or 8-bit VGA. In such cases, the frame rate for the received video may also need to be adapted to fit the sample and refresh rates of the display. The received digital frame information may optionally contain metadata required for such format conversions. Processor 248 may include processes to interleave the received digital video frame information to generate interlaced video to drive the analog monitor 210 or telecine operations to output an analog video signal with uniform frame rate. The processor 248 may include post-processing operations such as image and/or video enhancement and enhanced resampling.

Figure 3:
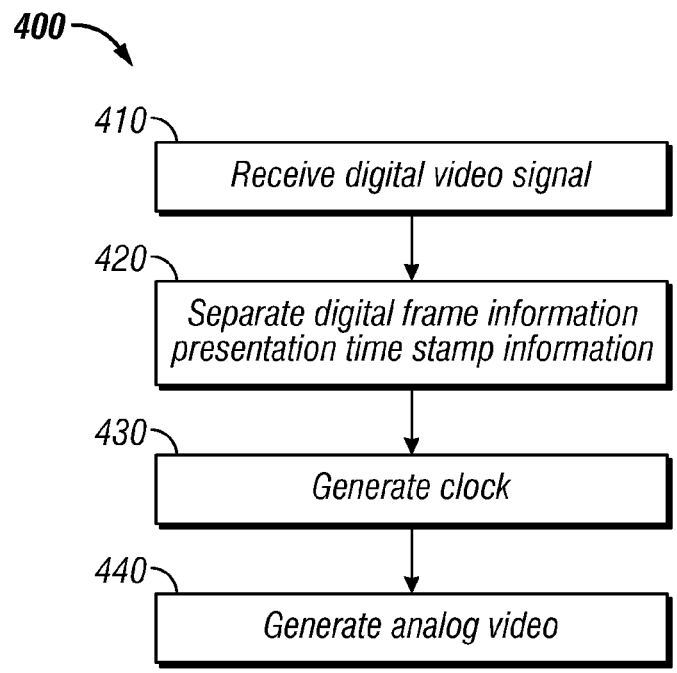
FIG. 3 is a flowchart illustrating a method for generating an analog video signal.

An example of the method preformed by decoder 224 is illustrated in FIG. 3. At state 410 receiving means such as receiver 242 of FIG. 2 receives the digital video signal. After the digital video signal has been received, at optional state 420, separating means such as parser 244 of FIG. 2 processes the digital video signal so as to separate the digital frame information and the PTS information. At state 430, the clock generator means such as clock generator 246 of FIG. 2 generates a display reference clock, and at state 440 the processing means, such as processor 248 of FIG. 2 generates an analog video signal for an analog display. It is understood that these embodiments of the method may have certain steps removed and/or rearranged and/or may include additional steps, without departing from the spiritual scope of the invention.

Figure 4A:
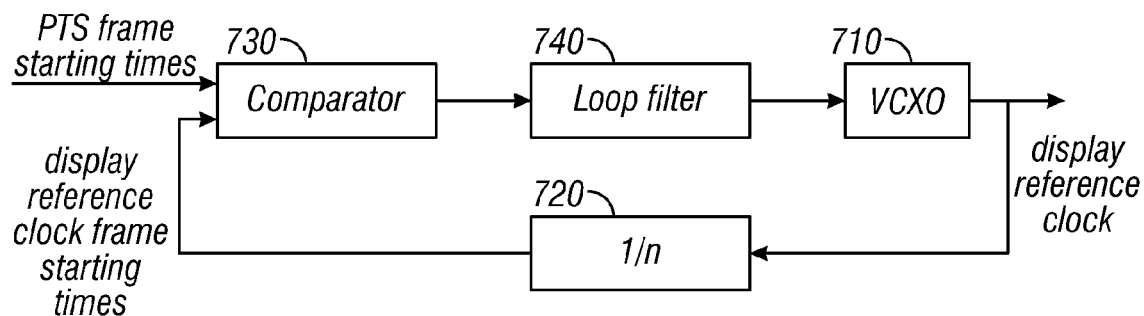
FIG. 4A is a block diagram illustrating a technique for generating an analog video clock.

FIG. 4A illustrates an example of a clock generator which may be used in some embodiments of a decoder of the disclosed method. Other clock generators may also be used. The clock generator of FIG. 4A is configured to receive PTS information comprising digital frame timing information. The PTS information used in this example represents digital frame starting times, although other digital frame reference times are possible. The clock generator generates a display reference clock based on the PTS information. The display reference clock is generated according to a feedback loop which compares the PTS frame starting times to the display reference clock frame starting times. The display reference clock frame starting times are generated by dividing the display reference clock by n, where n is the number of display reference clock cycles in each frame period. Comparator 730 compares the display reference clock frame starting times to the PTS frame starting times, and generates an error signal based on the difference. The error signal, may at least, indicate whether the display reference clock is too fast or too slow. The error signal is provided to a Loop filter 740, which filters the error signal according to loop settling time and loop stability requirements of the system, and generates a vcxo control signal. The vcxo control signal is provided to a variable oscillator, such as voltage controlled crystal oscillator (VCXO) 710, which generates the display reference clock having a frequency corresponding to the vcxo control signal. In some embodiments a nominal frequency of the VCXO is 27 MHz, which can be divided down to a variety of display timing rates. The display reference clock is used by other circuitry to generate an analog video signal, and is provided to 1/n divider 720, which generates the divided display reference clock frame starting times provided to comparator 730 for comparison with the PTS frame starting times. Because of the negative feedback of the loop and the stability ensured by loop filter 740, after some settling time, the display reference clock may be substantially synchronous with the timing of the digital frame information.

In the feedback loop of FIG. 4A, the PTS frame starting times may be of a different format than the display reference clock frame starting times, generated by dividing the display reference clock by n. Therefore, in some embodiments, in order to compare the display reference clock frame starting times to the PTS frame starting times, a conversion circuit (not shown) is used. The conversion circuit may convert the PTS frame starting times to a clock signal and additionally or alternatively convert the display reference clock frame starting times to a format compatible for comparison to the PTS frame starting times. The conversion circuit may be part of comparator 730, and may be part of 1/n divider 720. In some embodiments the conversion circuit may be part of another circuit, or may stand alone.

In some embodiments the conversion circuit processes only a portion of the PTS frame starting times. For example, in some embodiments, although the PTS frame starting times contain whole seconds and fractional seconds, only the fractional seconds are processed. The conversion circuit may also convert the divided display reference clock frame starting times to a format compatible for comparison to the fractional seconds of the PTS frame starting times. In such embodiments, comparison errors can occur near whole second boundaries. For example, if a PTS frame starting time is just before a whole second boundary, and a display reference clock frame starting time is just after the whole second boundary, the comparator may determine that the error between the PTS frame starting time and the display reference clock frame starting time is about 1 second. Such comparison errors could substantially affect the stability of the loop and result in poor display reference clock characteristics. This would cause unacceptable video display performance. To prevent these effects, the comparison result may be selectively suppressed. For example, the error signal may be limited to certain maximum and minimum values. In another example, the comparator is configured to produce an error signal representing no error when such a great error occurs. In some embodiments the comparator is configured to suppress the comparison result when either the PTS frame starting time or the display reference clock frame starting time is near a whole second boundary. In some embodiments selective suppression actions are performed by circuitry other than the comparator.

Figure 4B:
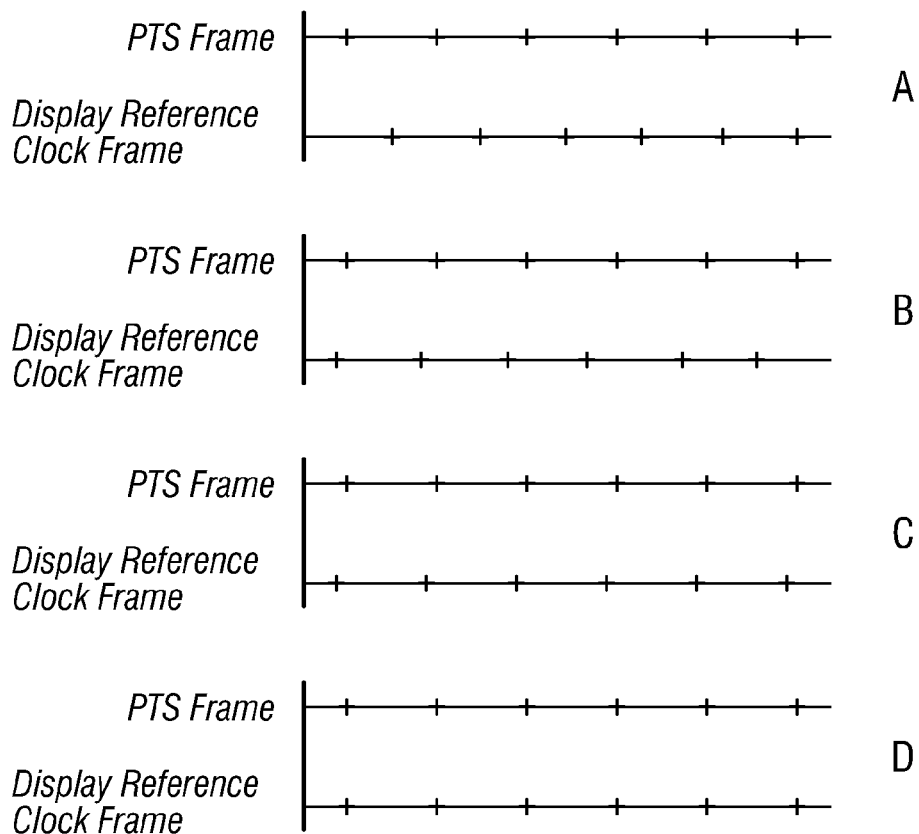
FIG. 4B is a diagram illustrating a timing relationship of the digital data clock and the analog video clock of FIG. 4A.

FIG. 4B illustrates an example of the timing relationship between the PTS frame starting times and the display reference clock frame starting times at various time windows A-D while the feedback loop of FIG. 4A is settling. At time window A, the PTS frame starting times and the display reference clock frame starting times are far apart. At time windows B and C, the PTS frame starting times and the display reference clock frame starting times are approaching one another. Finally, at time window D, the PTS frame starting times and the display reference clock frame starting times are substantially synchronous. Accordingly, the display reference clock is substantially synchronous with the digital frame information.

An example of a decoder having the clock generator of FIG. 4A can have a processor configured to receive the digital frame information and the synchronous display reference clock, and generate the analog video signal by processing the digital frame information based on the synchronous display reference clock. Such an example of a decoder has the processing task of coordinating the time information from the digital video signal and the analog video signal mostly implemented in the circuitry of the clock generator, which is configured to generate a display reference clock which is synchronous with the digital frame information.

Other examples of a decoder have the processing task of coordinating the time information from the digital video signal and the analog video signal mostly implemented in the circuitry of the processor. Such embodiments have a clock generator configured to produce a display reference clock which is not synchronous with the digital frame information, but has a frequency that is near a clock that is synchronous with the digital frame information.

Figure 5:
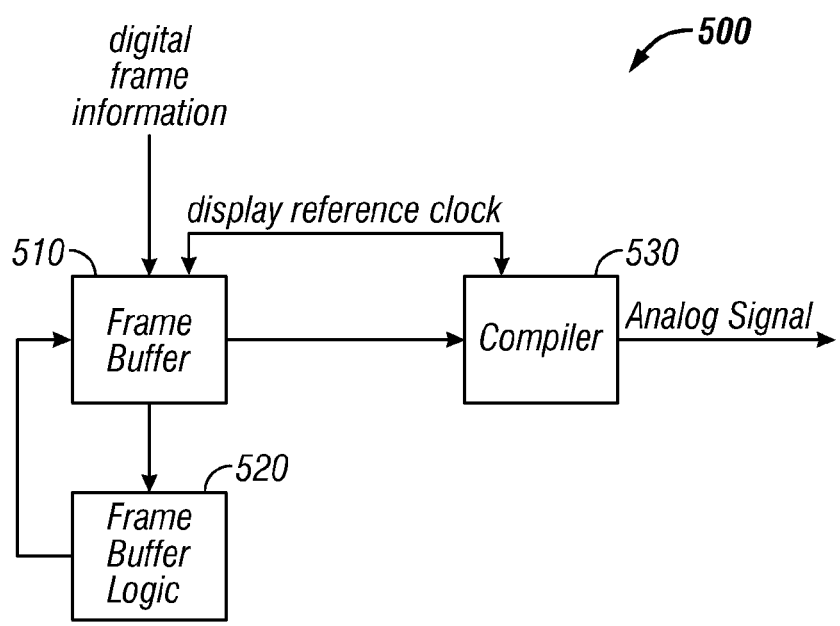
FIG. 5 is a block diagram illustrating a technique for generating an analog video signal.

FIG. 5 illustrates an example of a processor 500 which may be used in a decoder, which has the processing task of coordinating the time information from the digital video signal and the analog video signal mostly implemented in the circuitry of the processor. Other processors may also be used. Processor 500 comprises frame buffer 510, frame buffer logic component 520, and compiler 530, and is configured to receive digital frame information and a display reference clock which is not synchronous with the digital frame information. Processor 500 is further configured to generate an analog video signal based on the digital frame information and the display reference clock.

Frame buffer 510 receives the digital frame information based on a clock (not shown) which is asynchronous with the display reference clock, and stores the digital frame information serially. Frame buffer 510 is further configured to receive the display reference clock and to serially provide the stored digital frame information to compiler 530 according to the display reference clock. Frame buffer 510 is configured as a first in first out (FIFO) type memory element so that the order in which the digital frame information is received is preserved as the digital frame information is provided to compiler 530.

Compiler 530 is configured to receive the digital frame information and the display reference clock, and to generate an analog video signal based on the digital frame information processed according to the display reference clock, and based on memory data to generate horizontal and vertical sync pulses and color burst information. The compiler generates the analog video signal in accordance with an analog display signal standard, such as NTSC or PAL.

Processor 500 also comprises frame buffer logic component 520, which is configured determine to which memory location received digital frame information could be stored, and to determine from which memory location stored digital frame information could be provided to compiler 530. Frame buffer logic component 520 is configured to determine the memory locations such that the operation of frame buffer 510 occurs in a (FIFO) fashion.

Because the digital frame information is received with timing based on a clock (not shown), which is asynchronous with the display reference clock, the frame buffer may either underflow or overflow. Frame buffer logic 520 may be configured to respond to overflow conditions by instructing frame buffer 510 to not store an incoming digital frame. The digital frame not stored may be lost and consequently may not be displayed, but the overall presentation quality of the displayed video may be only minimally degraded. Similarly, frame buffer logic 520 may be configured to respond to underflow conditions by instructing frame buffer 510 to repeat a digital frame. Thus buffer 510 may provide compiler 530 with an additional digital frame to correct the underflow condition. The digital frame can also be interpolated from neighboring frames.

Other examples of decoder 224 of FIG. 2 have the processing task of coordinating the time information from the digital video signal and the analog video signal implemented substantially in both the circuitry of the clock generator and the circuitry of the processor. In one example, the clock generator is configured to produce a display reference clock, which is not synchronous with the digital frame information, but has a frequency which is near a clock that is synchronous with the digital frame information, and which is adjusted such that over time, the average difference between frequency of the display reference clock and a clock which is synchronous with the digital frame information is substantially zero.

Figure 6A:
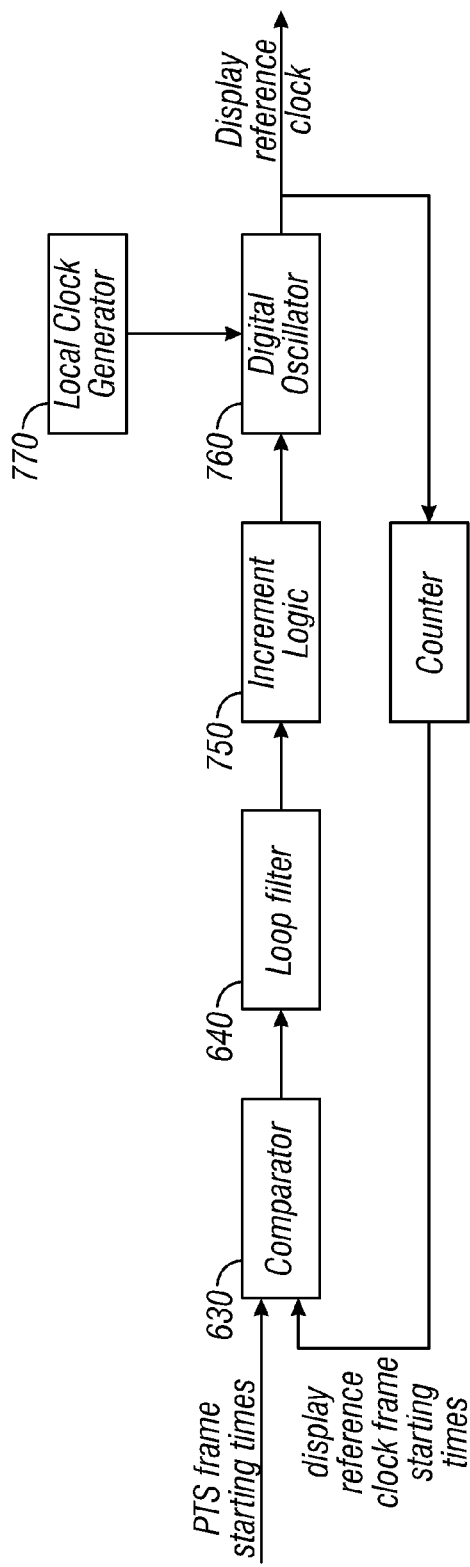
FIG. 6A is a block diagram illustrating a technique for generating an analog video signal.

A block diagram illustrating the functionality of such a clock generator is shown in FIG. 6A. The clock generator of FIG. 6A is configured to receive PTS information comprising timing for digital frame information of a digital video signal. The PTS information used in this example represents digital frame starting times (PTS frame starting times), although other digital frame reference times can also be used. The clock generator generates a display reference clock. The display reference clock is generated according to a feedback loop which compares the PTS frame starting times to frame starting times based on the display reference clock (display reference clock frame starting times). Ideally the display clock frame starting times (used for display of the analog video signal) would be identical to the PTS frame starting times (used for display of the digital data). However, because the PTS clock and display reference clock are not synchronous, this does not occur. The display reference clock frame starting times are generated in counter 620 by dividing the display reference clock by n, where n is the number of display reference clock cycles in each frame period. Comparator 630 compares the display reference clock frame starting times to the PTS frame starting times, and generates an error signal based on the difference. The error signal may at least indicate whether the display reference clock is too fast or too slow. The error signal is provided to a loop filter 640, which filters the error signal according to loop settling time and loop stability requirements of the system, and generates an increment change signal based on the error signal. The increment change signal indicates whether the frequency of the loop could be adjusted and whether the adjustment could be to a higher frequency or to a lower frequency. The increment change signal is provided to increment logic 750, which generates an increment signal based on the increment change signal. In some embodiments, the increment signal at least indicates the duration of a period of the display reference clock, where the duration is expressed as a quantity of periods of a local clock. Other duration indications are possible. The increment signal is provided to a digital oscillator 760, which also receives the local clock from local clock generator 770. Digital oscillator 760 produces the display reference clock by counting local clock periods and producing one period of the display reference clock for every quantity of local clock periods indicated by the increment signal. For example, if the frame rate of the PTS frames is precisely 30 frames per second (FR), the number of display reference clock periods in each frame is (n), and the frequency of the local clock ($f_{lc}$) is precisely 27 MHz, the number of local clock periods in each display reference clock period is $f_{lc}/FR/n=Y$. Accordingly, as the feedback loop of FIG. 6A adjusts the increment signal so as to best match the display reference clock frame starting times with the PTS frame starting times, the increment signal may settle to precisely Y local clock periods per display reference clock period. However, the frame rate of the PTS frames in real systems is not precisely 30 frames per second, and the frequency of the local clock is not precisely 27 Mhz. Accordingly, $f_{lc}/FR/n$ is not precisely Y. The feedback loop may attempt to settle the increment signal to the value $f_{lc}/FR/n$, but as the increment signal is quantized, for example, to whole numbers representing a number of local clock periods per display reference clock period, the feedback loop of FIG. 6A does not settle to values of the increment signal more precise than the precision associated with the quantization. However, the feedback loop of FIG. 6A does settle to values of the increment signal near $f_{lc}/FR/n$, and time adjusts the increment signal such that the increment signal averages to $f_{lc}/FR/n$. The result is that the display reference clock frame starting times drift slightly about the PTS frame starting times, where the difference between the display reference clock frame starting times and the PTS frame starting times has an average of substantially zero and minimum and maximum values determined by loop implementation characteristics such as quantization of the increment signal and loop stability parameters.

Figure 6B:
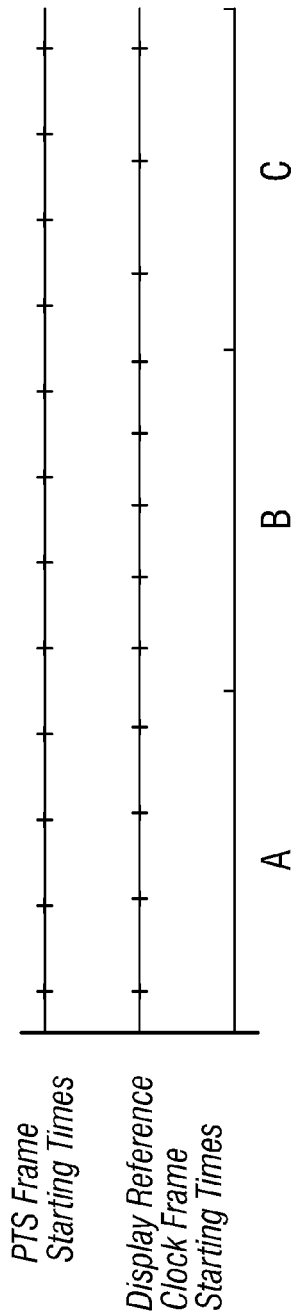
FIG. 6B is a diagram illustrating a timing relationship of the digital data clock and the analog video clock of FIG. 6A.

FIG. 6B illustrates an example of PTS frame starting times and display reference clock frame starting times for an apparatus such as that described with reference to FIG. 6A. As shown, during a first time segment A, the periods between the display reference clock frame starting times are longer than the periods between the PTS frame starting times. Accordingly, the time difference between pairs of corresponding PTS and display reference clock frame starting times (display reference clock frame starting time minus the corresponding PTS frame starting time) gets larger with each subsequent pair. Once the difference reaches a maximum level determined by the characteristics of the loop implementation, the increment signal is reduced. Consequently, the period between the display reference clock frame starting times reduces. Accordingly, as shown in second time segment B, the periods between the display reference clock frame starting times are shorter than the periods between the PTS frame starting times. As a result, the difference between pairs of corresponding PTS and display reference clock frame starting times gets smaller with each subsequent pair. Once the difference reaches a minimum level determined by the characteristics of the loop implementation, the increment signal is increased. Consequently, the period between the display reference clock frame starting times increases. Accordingly, as shown in third time segment C, the periods between the display reference clock frame starting times are once again longer than the periods between the PTS frame starting times. As a result, the difference between pairs of corresponding PTS and display reference clock frame starting times once again gets larger with each subsequent pair. Once the difference reaches a maximum level determined by the characteristics of the loop, the increment signal is once again decreased. As a result, the period between the display reference clock frame starting times once again decreases. This process continues, as needed. Accordingly, the display reference clock frame starting times are near but not identical to PTS frame starting times. The difference between the two may average to zero, or some other desired difference, and the maximum and minimum differences may be managed according to loop implementation.

In some embodiments, it may be desirable to capture information about the clock associated with the PTS frame starting times (PTS clock). Although other methods may be used, such information can be extracted, for example, by measuring the duration of PTS frames in terms of $f_{lc}$ periods. Another way to capture information about the PTS clock is based on the increment signal produced by increment logic 750. The time averaged value of the increment signal indicates the value of $f_{lc}/FR/n$ with precision related to the implementation of the averaging method and related to the drift in time of $f_{lc}$ and FR, where $f_{lc}/FR/n$ indicates the number of local clock periods in each PTS clock period. Accordingly, with the PTS frame starting times supplied and the calculated PTS clock period in terms of local clock periods, the clock generator can produce an output indicating the timing information of the PTS clock in terms of local clock periods.

Some embodiments of a decoder having the processing task of coordinating the timing of the digital video signal and the timing of the analog video signal implemented substantially in both the circuitry of the clock generator and the circuitry of the processor may include a processor configured to output an analog video signal based on the digital frame information according to the display reference clock, where the display reference clock is not synchronous with the digital frame information, such as, but not limited to the display reference clock discussed above with reference to FIG. 6A. Because the display reference clock is not synchronous with the digital frame information, the processor may be configured to adjust the analog video signal so as to compensate for the differences in the timing between the image presentation times according to the display reference clock and the image presentation times associated with the PTS clock.

Such a processor receives the display reference clock and a signal indicating timing information of the PTS clock. The processor uses the display reference clock as a timing reference. For each cycle of the display reference clock, the processor outputs a next analog video signal value as part of the analog video signal for the analog monitor. Each analog video signal value is generated for a specific physical location on the analog monitor. During each display reference clock frame, each physical location on the analog monitor is supplied with a next analog video signal value. The processor produces the analog video signal values based at least in part on the digital frame information, the display reference clock, and the signal indicating timing information of the PTS clock.

Figure 7:
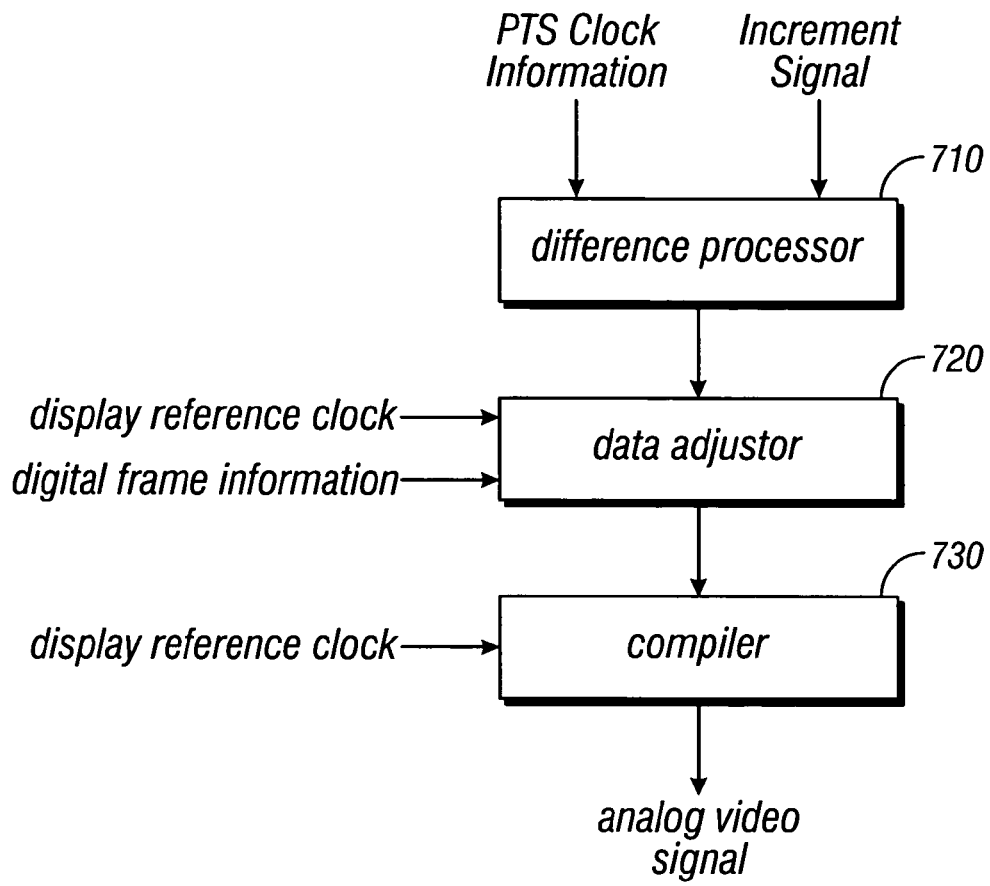
FIG. 7 is a block diagram illustrating a processor for carrying out aspects of the disclosed method.

For example, FIG. 7 shows an example of a processor configured to receive the duration of the PTS frame (PTS clock information) in terms of local clock periods and the increment signal indicating the number of local clock periods for each display reference clock period. The PTS frame duration and the increment signal are received in the difference processor 710. Difference processor 710 calculates the duration of display reference clock frames in terms of local clock periods by multiplying the number of local clock periods for each display reference clock period by the number of display reference clock periods in each frame. The PTS frame duration and the display reference clock frame duration are usually not identical. Difference processor 710 also calculates the difference between the PTS frame duration and the display reference clock frame duration, which represents a timing error between the PTS system and the analog system.

Figure 8:
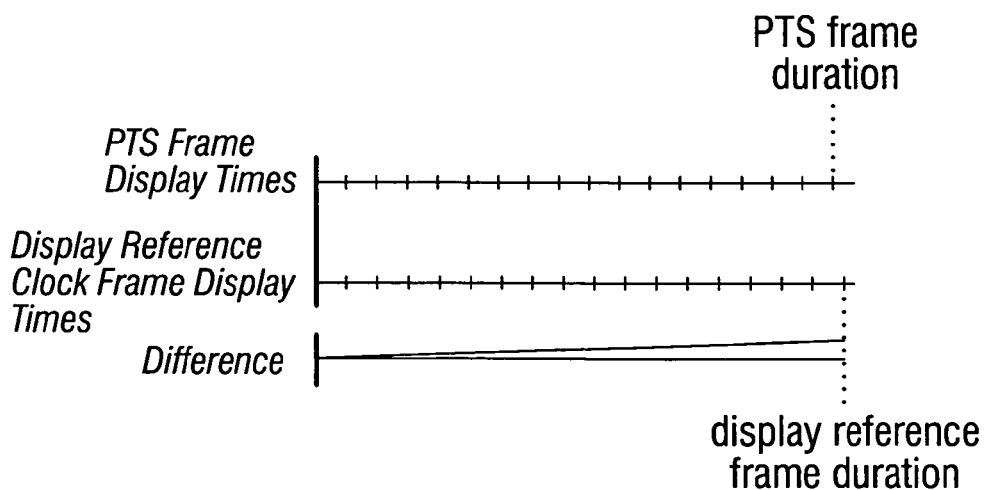
FIG. 8 is a timing diagram illustrating a timing relationship between PTS frame display times and analog display reference clock frame display times.

FIG. 8 graphically illustrates the timing error throughout one display reference clock frame. The unequal times of the PTS frame duration and the display reference clock frame duration are indicated. As seen in FIG. 8, at the beginning of the frame the difference between the display reference clock and the PTS frame timing information is substantially zero. As presentation of the frame proceeds, however, the difference between the display reference clock and the PTS frame timing information increases. Finally, at the end of the frame, the difference between the display reference clock and the PTS frame timing information is equal to the difference between the PTS frame duration and the display reference clock frame duration.

To compensate for this timing error within a frame, the analog video signal value can be adjusted at each point in time of the display reference clock according to a calculated magnitude of the current error. This is accomplished by the data adjustor 720 of FIG. 7. The adjustments may be made using a simple interpolation algorithm which calculates a value based on the two nearest digital frame information values. For example, if a display time according the display reference clock is after a first display time according to the digital frame information and before a second display time according to the digital frame information, such that the difference between display time according the display reference clock and the first display time is $\frac{1}{10}^{th}$ the difference between the first and second display times. The analog video signal value used for display may be the value corresponding to the first display time plus $\frac{1}{10}^{th}$ the difference between the values corresponding to the first and second display times. Other algorithms may also be used. Some embodiments use algorithms that make calculations based on values other than or more than the two nearest digital frame information values, so as to calculate non-linear relationships between the display value and the two nearest digital frame information values.

In one example, the system may have a difference between the PTS frame duration and the display reference clock frame duration of 1 display reference clock period. Because at the beginning of each display reference clock frame, the difference between the display reference clock frame display times and the PTS frame display times is substantially zero, the digital frame information can be converted to the analog video signal values without adjustment. However, by the middle of the frame, because the difference between the display reference clock and the PTS frame display time is about $\frac{1}{2}$ display reference clock period, the digital frame information for the middle of the frame may be adjusted according to the $\frac{1}{2}$ display reference clock period difference before being converted to the analog video signal values. Such an adjustment may be that the converted value is equal to $\frac{1}{2}$ the sum of the previous and the next value of the digital frame information. Similarly, because the difference between the display reference clock and the display times according to the PTS frame at the end of the frame is 1 display reference clock period, the digital frame information for the end of the frame may be adjusted according to the 1 display reference clock period difference before being converted to the analog video signal values. In some embodiments, all or some adjustments may be made to the analog video signals after the digital frame information has been converted.

The processor of FIG. 7 further comprises a complier 730 configured to receive the adjusted frame information from data adjustor 720 and the display reference clock, and to generate an analog video signal based on the adjusted frame information, the display reference clock, and memory data to generate horizontal and vertical sync pulses and color burst information. Compiler 730 may generate the analog video signal in accordance with an analog display signal standard, such as NTSC or PAL. Analog or digital RGB and or video synchronous digital interfaces such as CCIR 602 may be generated as well. Given the required video synchronous time reference.

In some embodiments of the processor of FIG. 7, difference processor 710 is configured to receive the PTS clock period in terms of local clock periods and the increment signal indicating the display reference clock period in terms of local clock periods. The PTS clock period and the display reference clock period may each be generated by a method, for example, such as that described above with reference to the clock generator of FIG. 6A. Accordingly, the PTS clock period may indicate an average display reference clock period and the display reference clock period may indicate the current display reference clock period. In such embodiments difference processor 710 calculates a difference between the PTS clock period and the display reference period. Data adjustor 720 accumulates the difference throughout the frame and adjusts the data at each point in time according to the accumulated difference. Data adjustor 720 may use similar algorithms as described above for adjusting the data.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods and devices.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus.

While the above detailed description has shown, described, and pointed out novel features as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. For example, assuming the above embodiments may have been described as being applicable to only video data, one skilled in the art may extend their applicability to audio data or multimedia data that may comprise video, audio or both video and audio data.

What is claimed is:

1. A method of processing multimedia data, comprising:
   receiving a global reference clock from a receiver;
   receiving the multimedia data from the receiver, the multimedia data comprising discrete time labels based on the global reference clock, wherein the global reference clock is received independent from the multimedia data;
   generating a second clock based at least in part on the discrete time labels; and
   generating analog multimedia signal values, wherein each of the values are generated based at least in part on a difference in timing of the discrete time labels and the second clock and on more than one multimedia data value, and
   wherein generating each analog multimedia signal value is based, at least in part, on a current frame's accumulated timing difference between the discrete time labels for the current frame and the second clock.

2. The method of claim 1, wherein generating the second clock further comprises comparing the discrete time labels second clock information.

3. The method of claim 1, wherein processing the multimedia data comprises at least one of skipping frames and repeating frames.

4. The method of claim 1, wherein generating the second clock comprises adjusting the period of the second clock to have a period substantially equal to a dynamically determined quantity of periods of a third clock.

5. The method of claim 4, wherein the third clock is asynchronous with the second clock.

6. The method of claim 5, wherein the average period of the third clock is substantially equal to the average period of the second clock.

7. The method of claim 1, wherein the timing difference is substantially the difference between the duration of a first frame according to the discrete time labels and a second frame according the second clock.

8. The method of claim 1, wherein the timing difference is substantially the difference between an average second clock period and a current second clock period.

9. The method of claim 1, wherein the analog multimedia signal is an NTSC or a PAL signal.

10. A multimedia data processing apparatus comprising:
    a receiver configured to receive a global reference clock and multimedia data, wherein the global reference clock is received independent from the multimedia data, and wherein the multi-media data comprises discrete time labels based on the global reference clock;
    a clock generator configured to generate a second clock based at least in part on the discrete time labels; and
    a processor configured to generate analog multimedia signal values based at least in part on a difference in timing of the discrete time labels and the second clock and on more than one multimedia data value,
    wherein the processor is further configured to generate each analog multimedia signal value based, at least in part, on a current frame's accumulated timing difference between the discrete time labels for the current frame and the second clock.

11. The apparatus of claim 10, wherein the clock generator is configured to compare discrete time labels with second clock information.

12. The apparatus of claim 10, wherein the processor is configured to at least one of skip frames and repeat frames.

13. The apparatus of claim 10, wherein the clock generator is configured to adjust the period of the second clock to have a period substantially equal to a dynamically determined quantity of periods of a third clock.

14. The apparatus of claim 13, wherein the third clock is asynchronous with the second clock.

15. The apparatus of claim 14, wherein the average period of the third clock is substantially equal to the average period of the second clock.

16. The apparatus of claim 10, wherein the timing difference is substantially the difference between the duration of a first frame according to the discrete time labels and a second frame according the second clock.

17. The apparatus of claim 10, wherein the timing difference is substantially the difference between an average second clock period and a current second clock period.

18. The method of claim 10, wherein the analog multimedia signal comprises at least one of NTSC and PAL formatting.

19. The apparatus of claim 10, wherein the apparatus is portable.

20. The apparatus of claim 10, wherein the apparatus is configured to be operated while mobile.

21. The apparatus of claim 10, wherein the processor is further configured to generate each analog multimedia signal value based, at least in part, on two multimedia data values corresponding to discrete time labels nearest the second clock.

22. The apparatus of claim 10, wherein the processor is further configured to generate each analog multimedia signal value based, at least in part, on a ratio of the time difference between a first and second discrete time label, and the first discrete time label and the second clock.

23. A multimedia data processing apparatus comprising:
means for receiving a global reference clock;
means for receiving multimedia data, wherein the multimedia data is received independent from the global reference clock and comprises discrete time labels based on the global reference clock;
means for generating a second clock based at least in part on the discrete time labels; and
means for generating analog multimedia signal values, wherein each of the values are generated based at least in part on a difference in timing of the discrete time labels and the second clock and on more than one multimedia data value, and
wherein said generating means is further configured to generate each analog multimedia signal value based, at least in part, on a current frame's accumulated timing difference between the discrete time labels for the current frame and the second clock.

24. The apparatus of claim 23, wherein the receiving means comprises a receiver configured to receive the multimedia data, the multimedia data comprising discrete time labels based on the global reference clock.

25. The apparatus of claim 23, wherein the clock generating means comprises a clock generator configured to generate a second clock.

26. The apparatus of claim 23, wherein the processing means comprises a processor configured to process the multimedia data so as to generate an analog multimedia signal, wherein the multimedia data is processed according to timing of the second clock.

27. The apparatus of claim 23, wherein the clock generating means further comprises means for comparing discrete time labels with second clock information.

28. The apparatus of claim 23, wherein the processing means comprises means for skipping frames and means for repeating frames.

29. The apparatus of claim 23, wherein the clock generating means comprises means for adjusting the period of the second clock by adjusting a value of a signal, the signal configured to indicate a quantity of periods of a third clock.

30. The apparatus of claim 23, wherein the timing difference is substantially the difference between the duration of a first frame according to the discrete time labels and a second frame according the second clock.

31. The apparatus of claim 23, wherein the timing difference is substantially the difference between an average second clock period and a current second clock period.

32. A non-transitory computer readable medium having instructions stored thereon that, when executed on a device cause the device to perform a method comprising:
receiving a global reference clock and multimedia data, wherein the global reference clock is received independent from the multimedia data and wherein the multimedia datacomprises discrete time labels based on the global reference clock;
generating a second clock based at least in part on the discrete time labels; and
processing the multimedia data by generating analog multimedia signal values, wherein each of the values are generated based at least in part on a difference in timing of the discrete time labels and the second clock and on more than one multimedia data value, and
wherein generating each analog multimedia signal value is based, at least in part, on a current frame's accumulated timing difference between the discrete time labels for the current frame and the second clock.

33. The medium of claim 32, wherein processing the multimedia data comprises at least one of skipping frames and repeating frames.

34. The medium of claim 32, wherein generating the second clock comprises adjusting the period of the second clock to have a period substantially equal to a dynamically determined quantity of periods of a third clock.

35. A processor configured to:
receive a global reference clock independent from multimedia data;
receive the multimedia data, wherein the multimedia data includes discrete time labels based on the global reference clock of a system comprising a transmitter and a receiver, said reference clock being global to the transmitter and the receiver;
generate a second clock based at least in part on the discrete time labels; and
process the multimedia data by generating analog multimedia signal values, wherein each of the values are generated based at least in part on a difference in timing of the discrete time labels and the second clock, and on more than one multimedia data value, and
wherein generating each analog multimedia signal value based, at least in part, on a current frame's accumulated timing difference between the discrete time labels for the current frame and the second clock.

36. The processor of claim 3, further configured to process the multimedia data by at least one of skipping frames and repeating frames.

37. The processor of claim 35, further configured to generate the second clock by adjusting the period of the second clock to have a period substantially equal to a dynamically determined quantity of periods of a third clock.

* * * * *